(12) United States Patent
Lau et al.

(10) Patent No.: US 7,317,174 B2
(45) Date of Patent: Jan. 8, 2008

(54) RECONFIGURABLE FOOD HEATING APPARATUS

(75) Inventors: Wilson (Wing Shun) Lau, Ma On Shan (HK); Cho Wing Hei, Tseung Kwan O (HK); Charles (U Fung) Lam, Kwai Chung (HK)

(73) Assignee: Tecnica International Limited, Hong Kong (HK)

( * ) Notice: Subject to any disclaimer, the term of this patent is extended or adjusted under 35 U.S.C. 154(b) by 44 days.

(21) Appl. No.: 11/593,824

(22) Filed: Nov. 6, 2006

(65) Prior Publication Data

US 2007/0241094 A1    Oct. 18, 2007

Related U.S. Application Data

(60) Provisional application No. 60/813,501, filed on Jun. 13, 2006, provisional application No. 60/791,674, filed on Apr. 12, 2006.

(51) Int. Cl.
*A21B 1/22* (2006.01)
*A21B 1/26* (2006.01)
*F27D 11/02* (2006.01)

(52) U.S. Cl. ............. 219/404; 219/405; 219/411
(58) Field of Classification Search ............ 219/404
See application file for complete search history.

(56) References Cited

U.S. PATENT DOCUMENTS 3,281,575 A * 10/1966 Ferguson, Jr. ............ 219/404
5,938,959 A * 8/1999 Wang ..................... 219/404
6,091,057 A * 7/2000 Asami et al. ............. 219/404
6,242,716 B1 * 6/2001 Wang ..................... 219/404
6,917,018 B1 * 7/2005 Wong ..................... 219/404
2004/0045950 A1 * 3/2004 Balandier et al. ......... 219/404

FOREIGN PATENT DOCUMENTS

| JP | 64-6624 A | * | 1/1989 |
| JP | 2004-019981 A | * | 1/2004 |
| JP | 2005-30713 A | * | 2/2005 |

* cited by examiner

*Primary Examiner*—Joseph Pelham
(74) *Attorney, Agent, or Firm*—Gallagher & Kennedy, P.A.; Thomas D. MacBlain

(57) ABSTRACT

A food heating or cooking appliance has at least one electrical heating element within its interior that is adjustable in position so as to be able to be moved close to thin or small food items under the control of a manually actuated control. A separator plate that extends across the interior chamber of the appliance from side to side and from front to back is movable with the heating element to enable adjustment of the volumetric size of the cooking chamber containing the heating element and the food to be heated or cooked. A manual actuator, a knob or lever, for example, moves the heating element and the separator plate through a motion transfer bar that extends across the width of the appliance and is attached to a linkage on each side of the appliance to communicate movement to a pair of movable supports supporting the rod-like heating element at each of its ends and the separator plate at opposite edges.

5 Claims, 11 Drawing Sheets

RECONFIGURABLE FOOD HEATING APPARATUS

CROSS REFERENCE TO RELATED APPLICATIONS

This application claims priority from U.S. provisional patent application Ser. No. 60/791,674 filed on Apr. 12, 2006 in the names of Wilson (Wing Shun) Lau, Wing Hei Cho and Charles (U Fung) Lam, and entitled "Reconfigurable Heating Element," and from U.S. provisional patent application Ser. No. 60/813,501 filed on Jun. 13, 2006, in the names of Wilson (Wing Shun) Lau and Charles (U Fung) Lam, and entitled "Electric Oven with Reconfigurable Heater Element and Separator Plate." Both applications are incorporated herein by reference.

FIELD OF THE INVENTION

This invention relates to an electrical food heating or cooking apparatus or appliance and more specifically to such an apparatus that is reconfigurable to better cook a variety of food items of various sizes.

BACKGROUND OF THE INVENTION

In the conventional oven or toaster oven, the heating elements are fixed in location and the heating compartment is fixed in size. When the user uses the oven to cook a thick food item such as, for example, a chicken or a thin food item such as a slice of bread to be toasted, the distance between the heating element and the food item differs due to the thickness differences among food items. Normally, it takes more time to cook a thin or small food item using an oven with a large heating compartment than it does an oven with a small heating compartment.

One example of the above is the ovens ordinarily called toaster ovens which have a relatively small heating compartment normally used to cook small food items and including the toasting of thin items like bread. Even here, the bread toasting time is normally longer in the toaster oven than in the usual toaster. This is due to the heating element or elements in the toaster being farther removed from the bread compared to the distance between the heating elements and the bread in the ordinary bread toaster. It would be desirable, therefore, to be able to reposition the heating element in an electrical food heating or cooking appliance so as to bring the heating element close to the food item irrespective of its size.

In addition electric ovens, such as toaster ovens, can be unable to achieve, in smaller food items, the desired surface characteristics of such items cooked by other means such as, for example, toasting, broiling, or grilling, by conventional toasters, oven broilers or grills.

There is a further shortcoming of heating or cooking a small or thin food item in an oven or heating appliance that has an interior volume much greater than the item that is to be heated or cooked. The volumetric space of the oven that is to be brought to temperature is much greater than necessary for the small or thin food item. The item could be heated or cooked more quickly and efficiently if the heating chamber could be reduced in volume about the item to be heated or cooked.

OBJECTS OF THE INVENTION

An object of the present invention is to improve the heating or cooking time and efficiency of an electric food heating or cooking appliance.

Another object of the present invention is to provide an electric food heating or cooking appliance with improved heating means so that smaller food items can be heated or cooked better and in less time and yet achieve the desirable surface characteristics.

Yet another object of the present invention is to provide an electric food heating or cooking appliance that can be reduced in the volumetric size of its heating chamber when a thinner or smaller food item is to be heated or cooked.

A further, specific object of the invention is to provide an electric oven that can toast bread in less time than conventional ovens of the same size to provide a toasting time that is much closer to that of a conventional bread toaster.

BRIEF SUMMARY

In accordance with the present invention a food heating or cooking appliance is provided with an electric heating element that is repositionable under the control of the user. This allows the electrical heating element to be brought close to the food item being heated or cooked irrespective of the thinness or thickness of the item. Faster cooking can be achieved. Better food surface characteristics can be achieved. More efficient cooking can be achieved.

In a further improvement of the electrical food heating or cooking appliance, within the interior, where a food item is to be located, a movable plate-like separator spans the interior from side to side and front to back. It substantially closes off the remainder of the interior closure from the location of the food being heated or cooked. If a small or thin item of food is being heated or cooked, the separator is moved close to the food item so that only a small cooking volume or chamber need be heated. The smaller chamber and the contained food heat more rapidly and more efficiently since it is unnecessary to heat the remaining, empty portion of the heating appliance's interior. While the separator may not fit sufficiently closely within the enclosure to seal off the food location, a substantial saving in cooking time and power usage can nevertheless be achieved if the separator extends across the interior of the heating appliance sufficiently even to loosely close off the food heating location.

Preferably, the movable heating element and the separator are mounted for movement together. It is contemplated that more than a single movable heating element may be supported for movement within the heating appliance. In the preferred, exemplary embodiment described in detail below, one electrical, rod-like heating element extending across the interior of the heating appliance from side to side is positionable by the user.

In accordance with a further feature of the invention, the heating or cooking appliance has a manually operable control for moving the heating element. The control is accessible on the exterior of the appliance for use by the user. When a separator is employed, that same manually operable control can be used to move the separator as well.

Preferably, in accordance with a preferred, exemplary embodiment of this invention, the separator has a reflective surface facing the heating location to reflect radiant heat towards food located there.

In the preferred, exemplary embodiment described below, the control for moving the heating element and/or the separator includes a manual actuator such as a turnable knob or lever on the exterior of the appliance. The manual control knob or lever is coupled to at least one linkage. The linkage connects with a movable support for the heating element and the separator.

Preferably, a motion transfer bar spans the interior of the enclosure from side to side, either within the enclosure or outside. It transfers the motion of the manually turnable control element to a further linkage on the side of the appliance enclosure remote from the previously mentioned linkage. The further linkage connects with a further heating element support at the remote end of the electrical heating element and to the remote edge of the separator.

In the preferred embodiment described below, at least one slot in each of two interior walls permits connection between ends of the heating element and the heating element supports. The supports may be clips that, in addition to receiving and supporting ends of the heating element, include inward projecting fingers extending through the slots to support the separator at opposite edges thereof. Thus arranged, the preferred exemplary embodiment provides for simultaneous smooth, easy movement of each end of the heating element and each of the two edges of the separator.

While the following detailed description of the preferred exemplary embodiment describes one manner of accomplishing the invention, alternative arrangements are within the scope of this invention. For example, although a manually, physically movable control element, a knob, is described, and is best for reasons of cost and simplicity, an electrically activated motor means such as a stepper motor could readily be employed under the control of a simple digital controller and key pad. The linkage described could take on other equivalent arrangements such as a set of linking gears, for example, a rack and pinion set, the rack moving the heater and separator linearly up and down within the enclosure. Other, equivalent alternatives to the specific exemplary provisions of the preferred embodiments are described below.

The above and further features of the invention will be better understood with reference to the accompanying drawings and the following detailed description of the preferred, exemplary embodiment.

DETAILED DESCRIPTION

Figure 1:
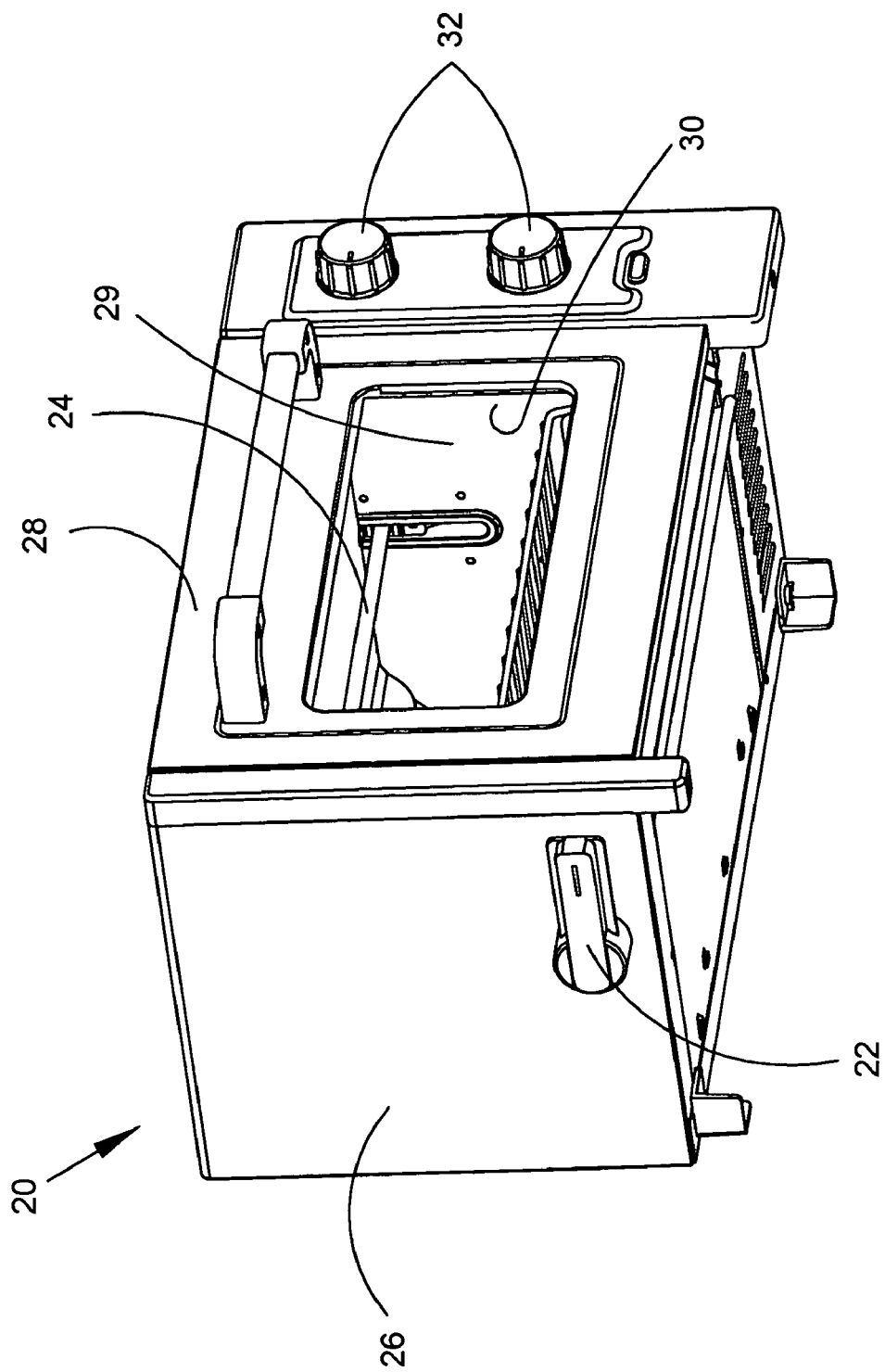
FIG. 1 is a perspective view of an electrical heating or cooking appliance (called often "oven" in connection with the specific embodiments described below), in accordance with this invention, and shows a movable electric heating element spanning the interior of the oven and a manual actuator on the exterior of the oven for moving the heating element.
Figure 2:
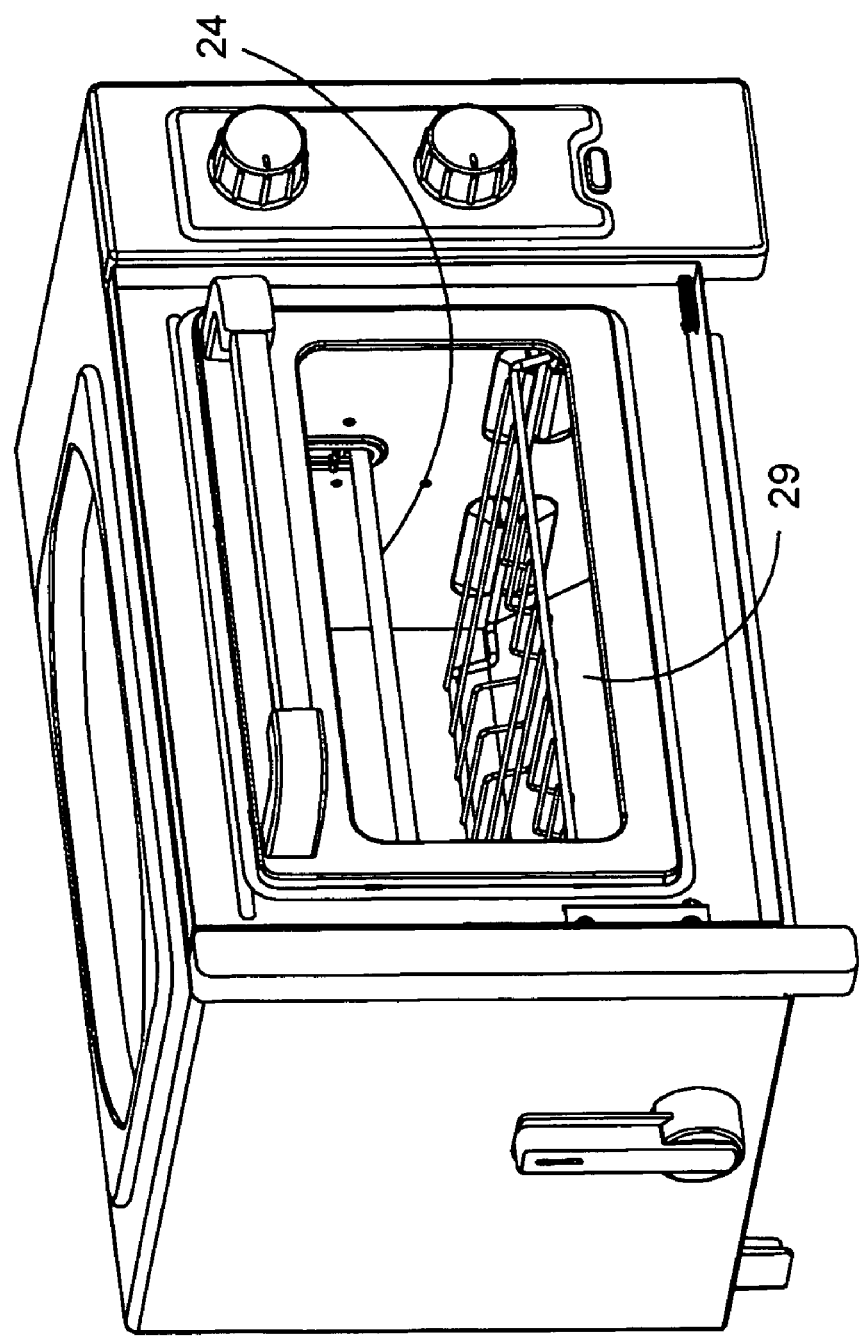
FIG. 2 is a further perspective view of the oven of FIG. 1 and shows the manual activator moved to locate the electric heating element lower in the oven interior.
Figure 3:
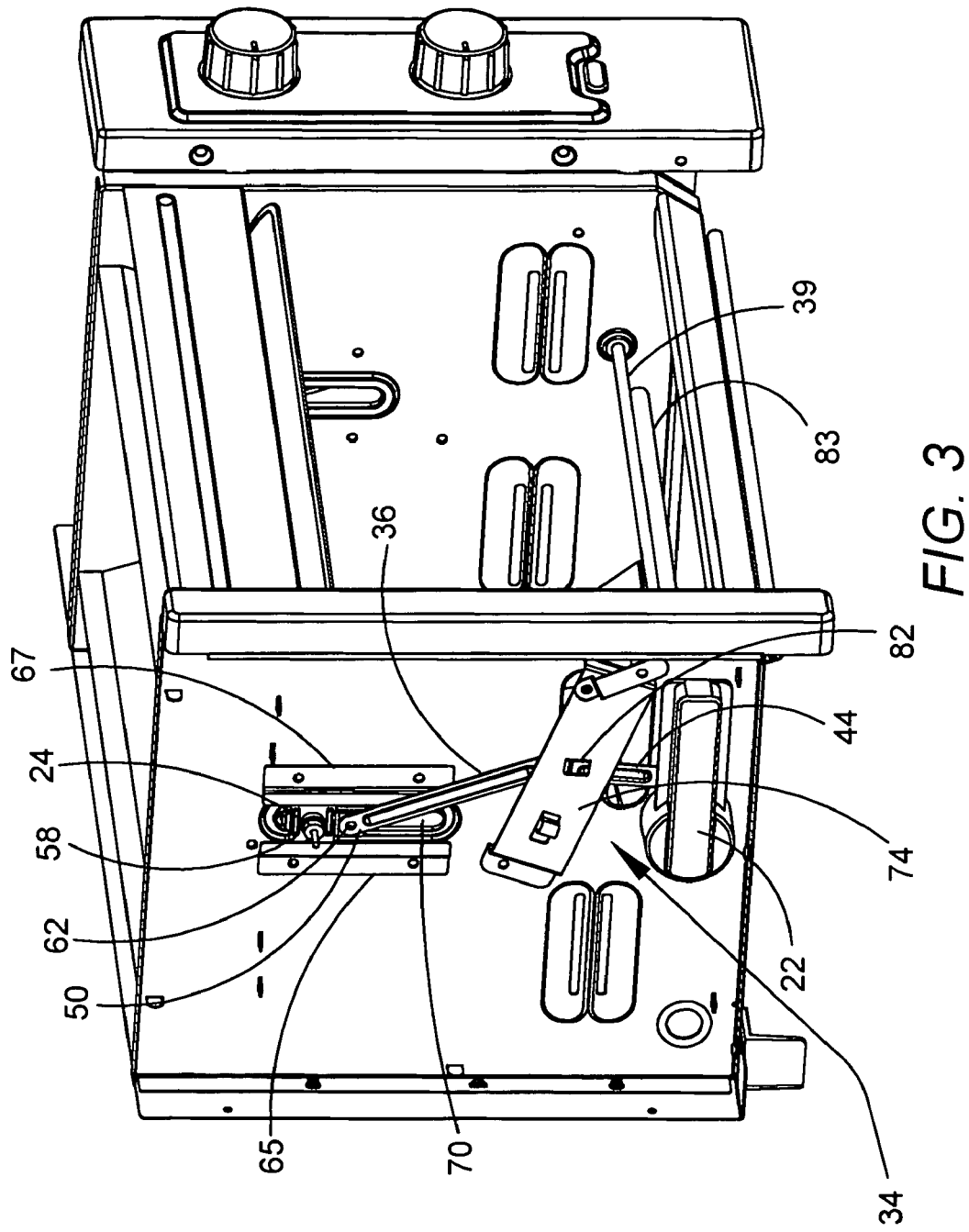
FIG. 3 is a further perspective view of the oven of FIGS. 1 and 2, with its exterior covering removed, to show a linkage coupling the manual activator to a movable support for the heating element, the heating element being in uppermost position.

As shown in FIG. 1, an oven 20, which may be what is typically referred to as a "toaster oven," has a manual control or actuator 22 that may be a knob or lever as shown to be used for changing the position of a heating element 24. The oven 20 has an outer casing 26. A door 28 has a clear window 29 revealing the interior chamber or heating compartment 30. Typical controls are shown at 32 and do not form a part of this invention. Through an internal mechanical construction shown in FIGS. 3-6, the heating element 24 can be moved up, as shown in FIG. 1, or down, as shown in FIG. 2, depending on the positioning of the actuator 22.

Both ends of the heating element 24 connect to a linkage system 34. The linkage system 34 includes a first linkage 36 on the actuator side of the oven (FIGS. 3 and 4) connected to a second remote linkage 38 on the remote side of the oven (FIGS. 5 and 6) by a motion transfer bar 39. The motion transfer bar 39 transfers the rotational motion of the actuator 22 to both sides of the linkage system 34 simultaneously. Hence the heating element 24 can be moved easily in an even motion.

Figure 4:
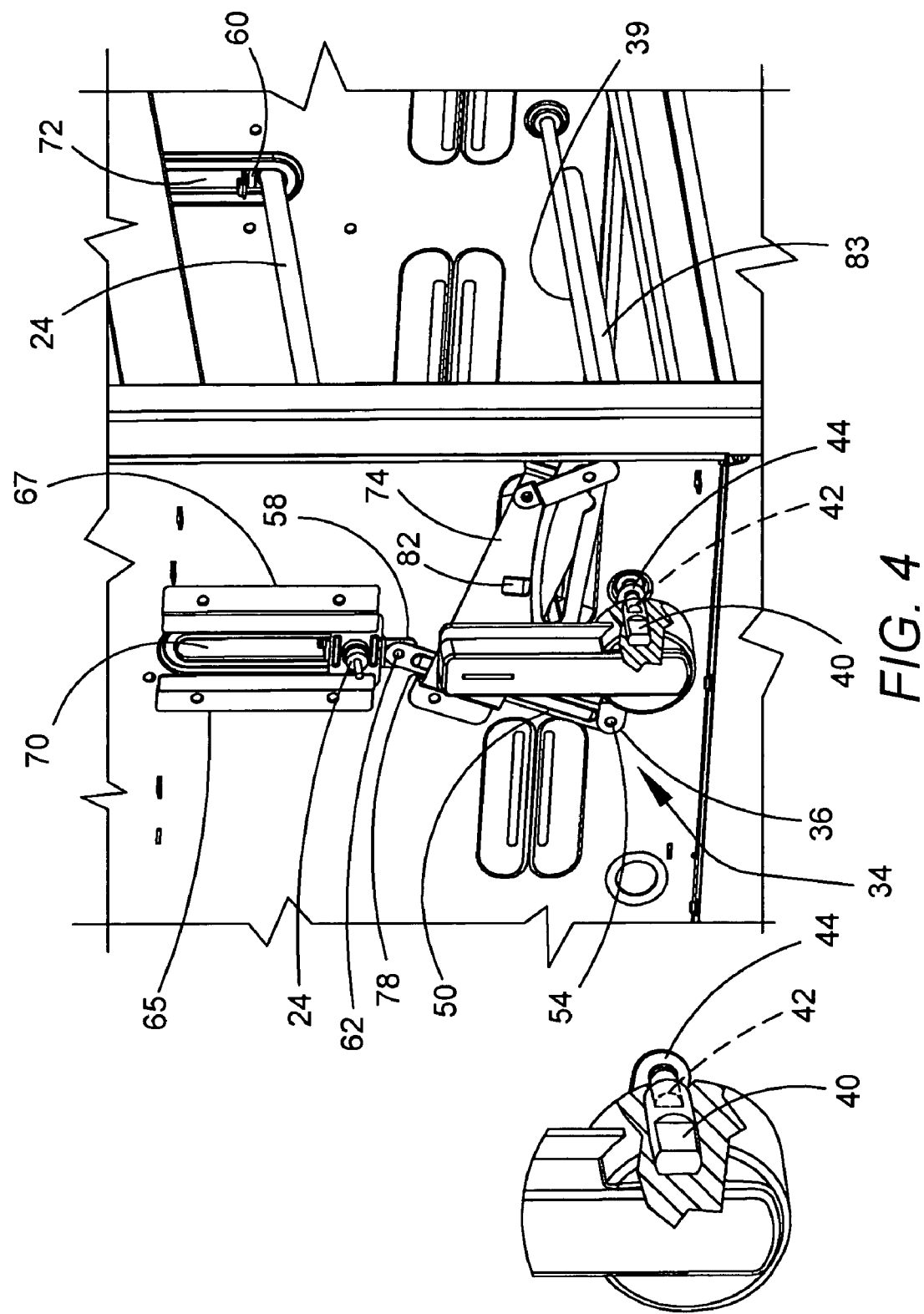
FIG. 4 is an enlarged fragmentary perspective view of the manual actuator and linkage of FIG. 3 and shows the manual actuator and linkage moved to position the heating element to its lowermost position.
Figure 5:
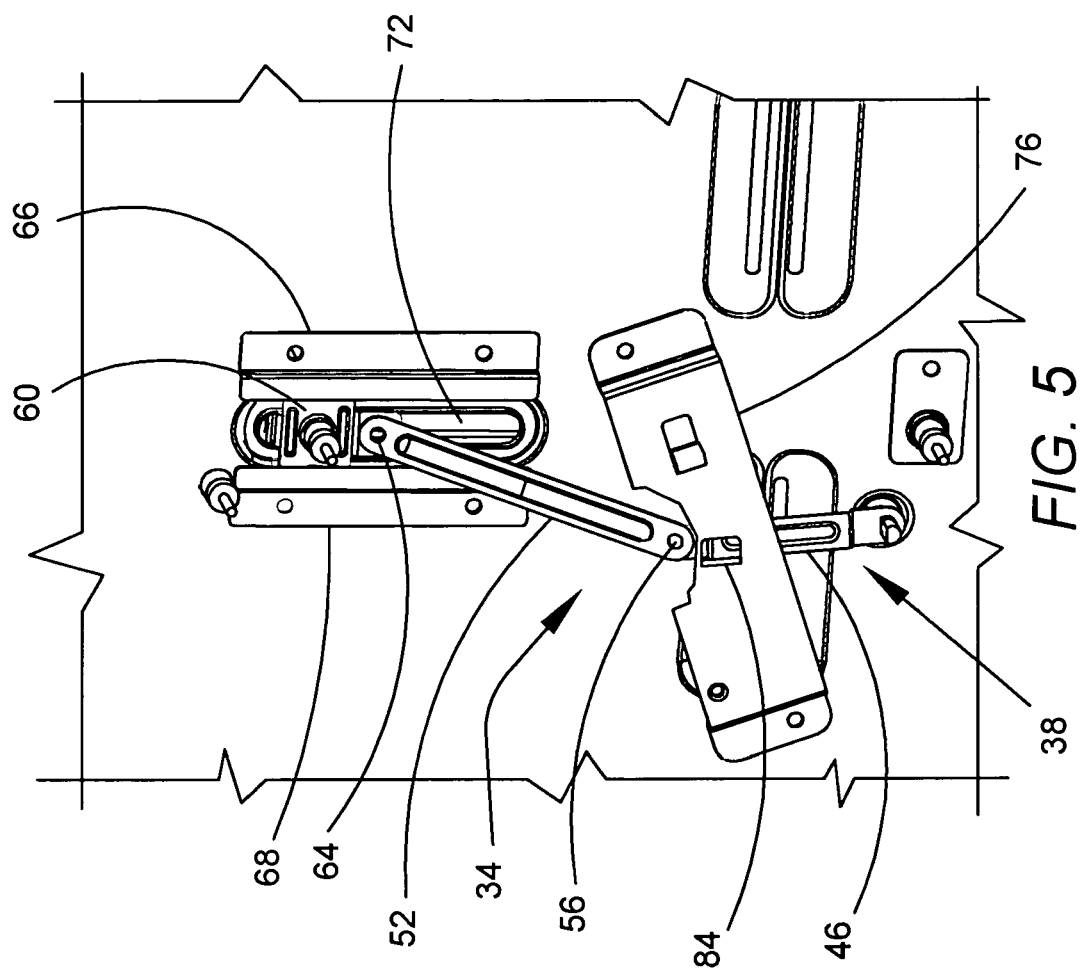
FIG. 5 is a fragmentary perspective view of the oven of FIGS. 1-4, again with exterior covering removed, and shows a further linkage on the side of the oven remote from the manual actuator and linked between a further movable support for the electric heating element (at its uppermost position) and a movement transmitting bar that transmits actuator movement to the remote side of the oven.
Figure 6:
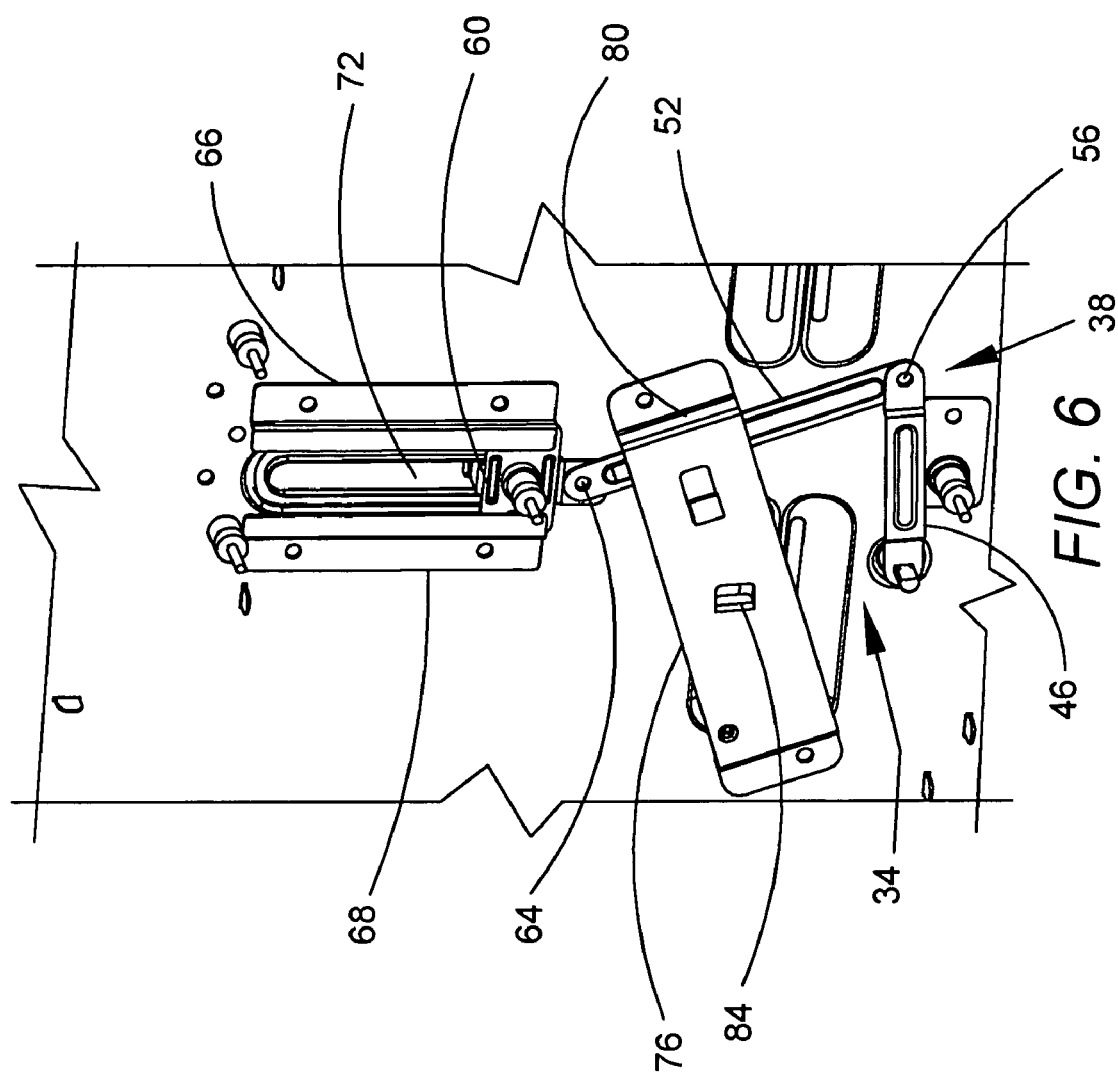
FIG. 6 is a further fragmentary perspective view like FIG. 5 and shows the linkage and support member moved to locate the heating element at its lowermost position.
Figure 7:
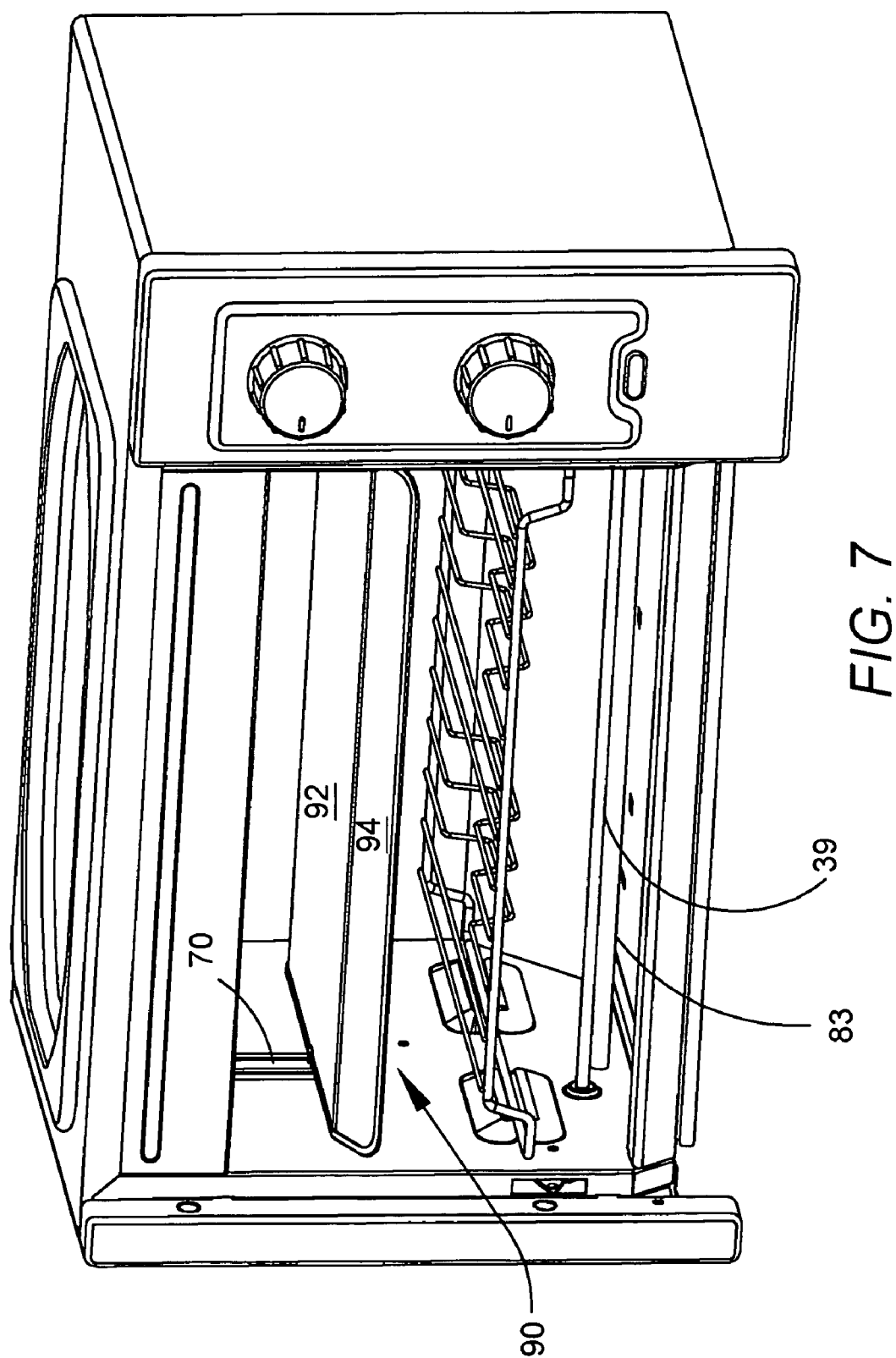
FIG. 7 is an enlarged perspective view of an oven like the oven of FIGS. 1-6, but including a movable separator shown in a lowered position to reduce the volumetric size of the heating chamber about a food item.

As seen in FIG. 4, viewing from the left side of the oven, the actuator 22 connects first to a connector 40. One end of the connector 40 is fixed to the actuator 22. Another end is fixed to the end of the motion transfer bar 39. As shown at 42 in FIG. 4, the motion transfer bar 39 has a 'D' shape section at both ends to connect with the ends of lower arms 44 and 46 of the linkages 36 and 38 respectively (FIGS. 3-6). These lower arms have D-shaped holes fitted to the ends of the motion transfer bar 39. Hence, the lower arms 44 and 46 can be rotated by turning the actuator 22. Another end of each of the lower arms 44 and 46 is linked to an end of an upper arm 50 and 52 by means of pivot pins or hinges 54 and 56 which can provide each upper arm 50 and 52 a free rotation on the hinge. Another end of each upper arm 50, 52 is linked to a support element 58, 60 by means of further pivot pin or hinge 62, 64 and the support elements 58 and 60 support the heating element 24. Note that while the motion transfer bar in the illustrated exemplary embodiment extends through the interior of the oven, it is contemplated that by an obvious re-arrangement of linkages and manual activator the motion transfer bar could lie outside the enclosure, for example below the enclosure floor spanning the enclosure and coupling together the linkages on each side of the oven.

When the upper arms 50 and 52 are driven by the lower arm 44 and 46, the support elements 58 and 60 and the heating element 24 are moved together up and down as the support elements are each guided by two pair of guiding plates 65, 67 and 66, 68 which are fixed on the outer side of the heating compartment parallel a pair of slots 70 and 72. The movement of the lower arms 44 and 46 and the upper arms 50 and 52 are restricted by brackets 74 and 76, each fixed on the outer side of the heating compartment. The brackets 74 and 76 have shoulders 78 and 80, indicated in FIGS. 3 and 6, that act as the stops for the upper arms 50 and 52. Inward stamped projections 82 and 84 on the brackets 74 and 76 act as stops for the lower arms 44 and 46. As the brackets 74 and 76 restrict movement by the linkages, the movement of the heating element 24 is likewise restricted.

While the embodiment illustrated in FIGS. 1-6 is shown controlling a single movable heating element 24, the invention is not limited to the control of a single heating element. It may be applicable to a group of heating element as well. Also, while the embodiment of FIGS. 1-6 is shown controlling the top heating element 24, the invention is not limited to the control of the top heating element. It may be applicable to any heating elements positioned in the appliance, for example the heating element 83 (FIG. 4) at a bottom position in the oven.

In addition to the foregoing features of the oven 20, as illustrated in FIGS. 1-6, in a further embodiment is illustrated in FIGS. 7-10, wherein like numerals identify like elements. There an additional preferably metal plate 90, called a "separator" movable together with the movable heating element 24 improves the cooking performance of the oven. The relative positioning of the heater element 24 and the separator 90 can best be seen in FIGS. 8 and 10. The separator 90 is located a short distance above the heating element 24. The heating element 24 and the separator 90 are positioned by the same actuator 22, motion transfer bar 39 and linkage system 34 as previously described and illustrated in FIGS. 1-6.

Figure 8:
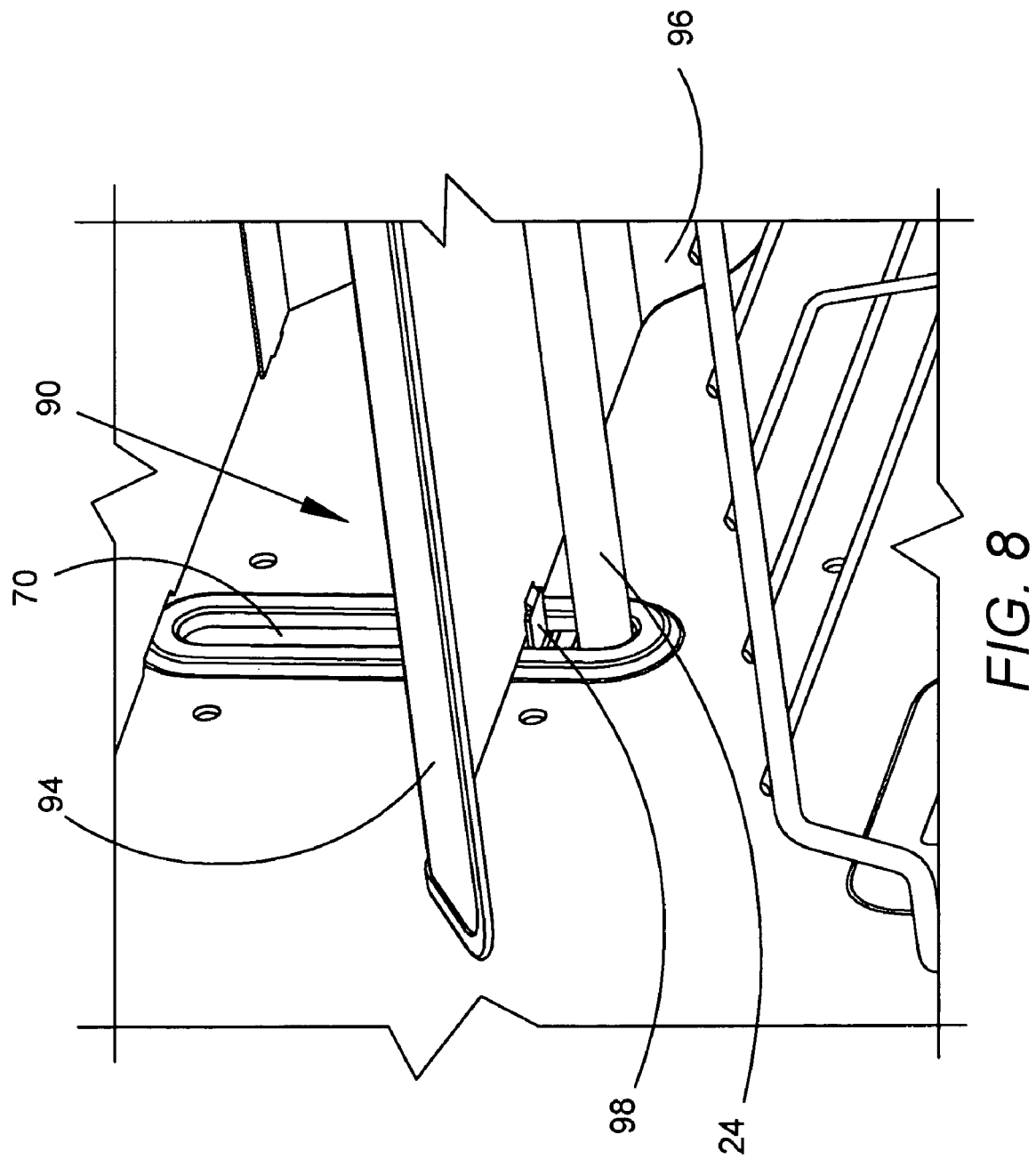
FIG. 8 is an enlarged, fragmentary perspective view of the oven of FIG. 7, and shows the movable heating element and separator again lowered fully.
Figure 9:
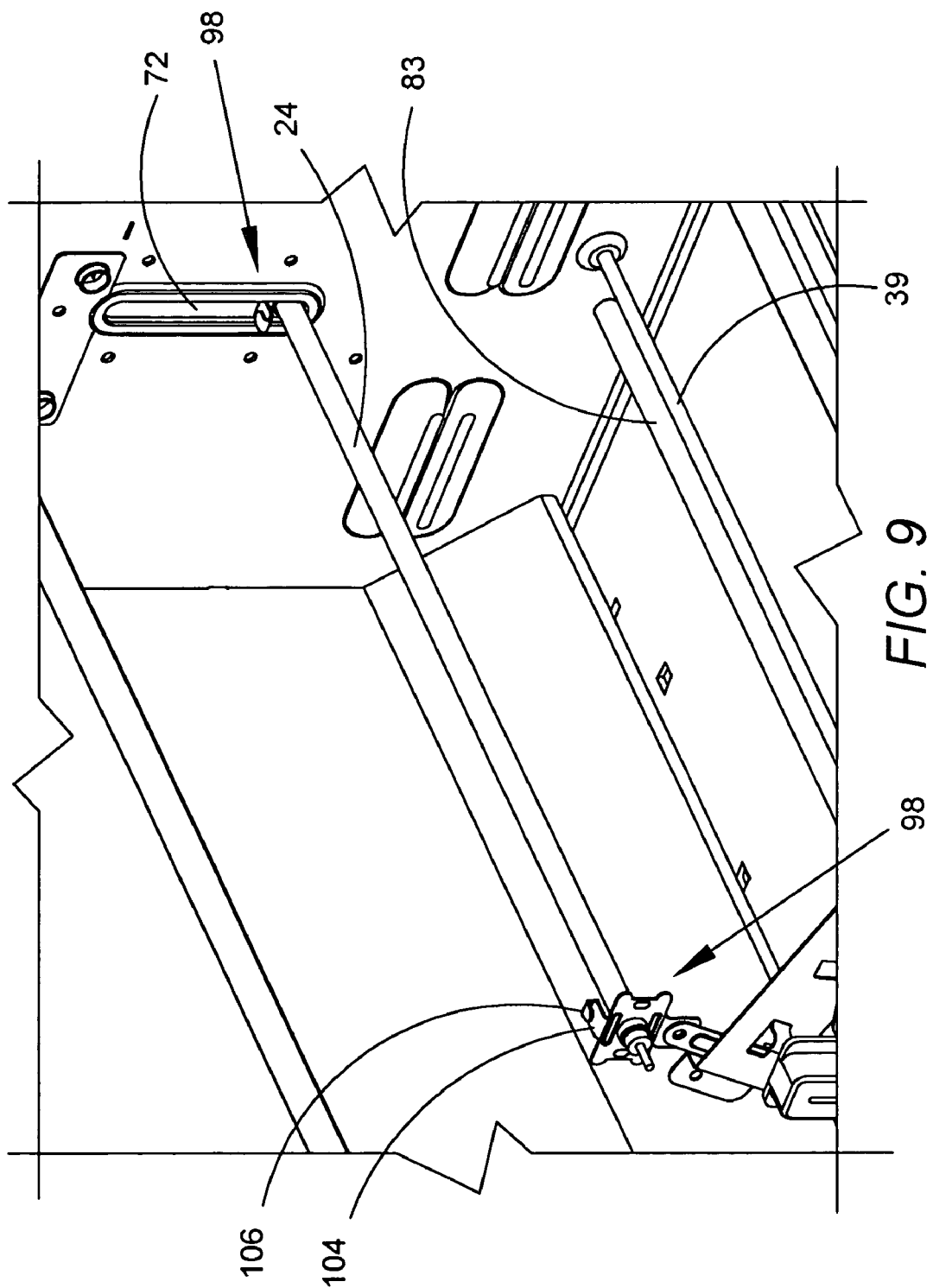
FIG. 9 is a further enlarged, fragmentary perspective view of elements of the oven of FIGS. 7 and 8, with the heating element lowered and the separator and left side of the oven removed.
Figure 10:
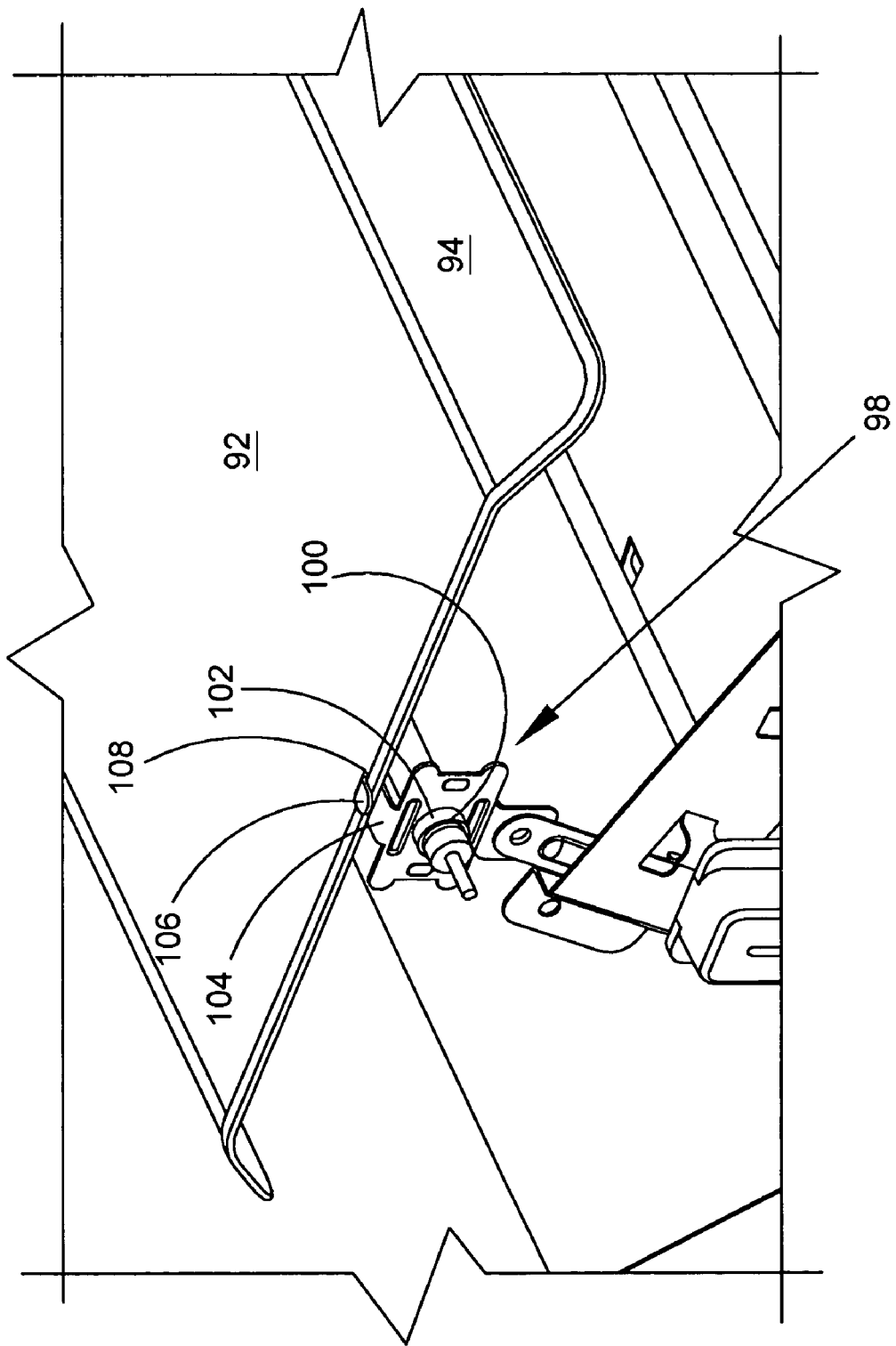
FIG. 10 is a further enlarged, fragmentary perspective view illustrating details of a clip connecting the separator and heating element to linkage for positioning them.
Figure 11:
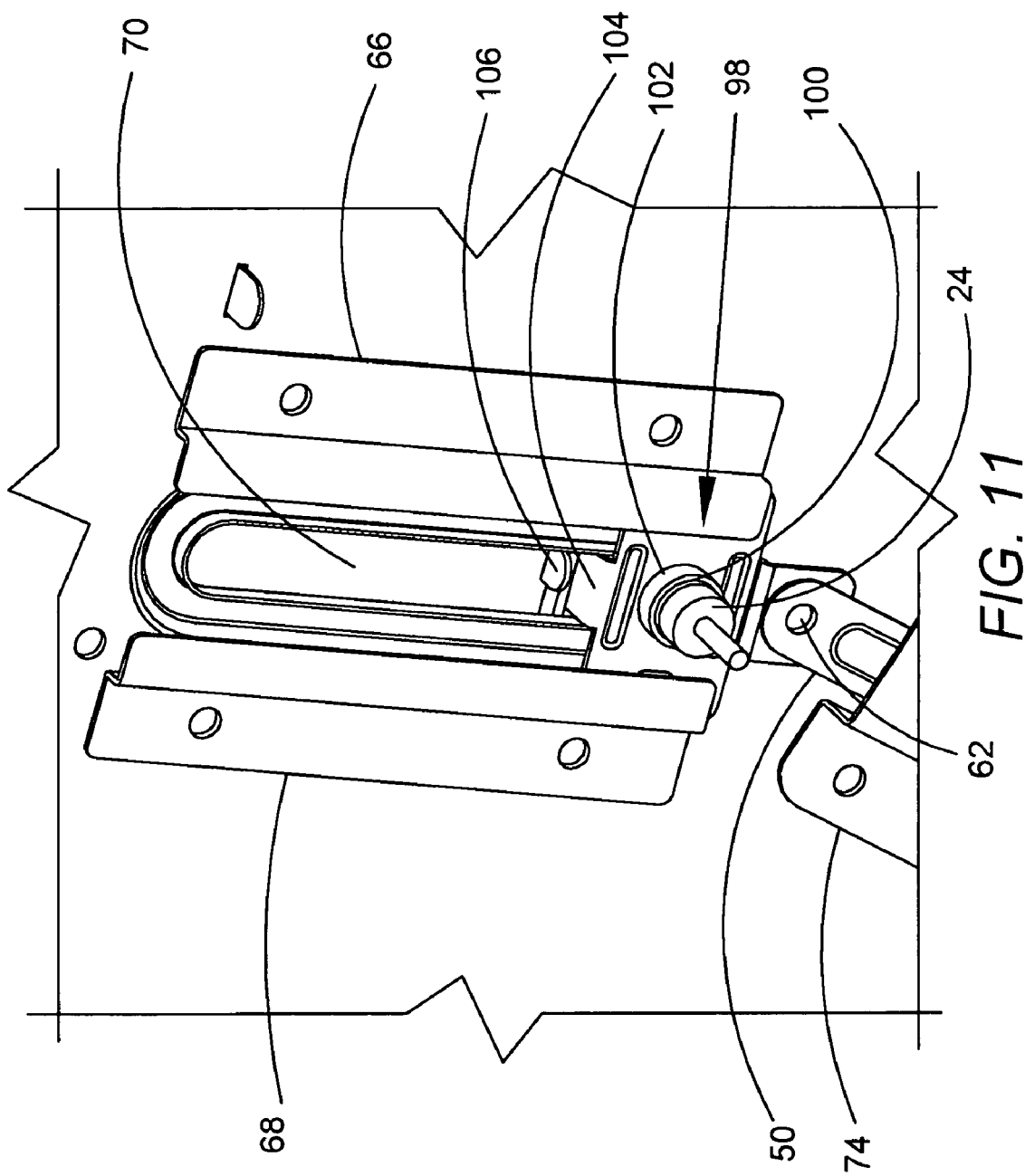
FIG. 11 is a further enlarged fragmentary perspective view of a portion of the clip of FIG. 10 extending from the location of the linkage through a slot in the oven wall to the separator.

The separator 90 has a relatively large, generally horizontal, planar central section 92 and front and back, inclined and smaller edge portion 94 and 96 (96 being seen in FIGS. 8 and 10). The separator 90 is a plate that extends across the interior or heating compartment 30 from side to side and front to back. Positioned just above the heating element 24, the separator 90 substantially closes off the portion of the heating compartment 30 containing the heating element 24 from the remainder of the interior above the separator, thus in essence forming a cooking chamber adjustable in size. Two clips 98 attach to the heating element 24, one near each of its lateral edges (FIGS. 8-11). One of the two clips 98 interconnects with the heating element 24 in the same way as the support element 58 of FIG. 4 do. That is to say, upon assembly, when the heating element 24 passes through a hole 100 (one shown) in the one clip 98, a flange 102 around the hole is forced to be deformed together with the heating element 24. The heating element is thus held fast against movement in the lateral direction at its one end. The other end of the heating element fits more loosely within the remaining clip 98 leaving that end free to move to allow for lengthwise heat expansion of the heating element. As shown in FIG. 10, at its lower end, each clip 98 attaches to one of the linkages 36 and 38 that position the heater as desired by use of the actuator 22 as described above.

At its upper end, each clip 98 has an inwardly projecting separator support finger 104 terminating in a bendable tab 106. Each clip finger 104 projects through one of a pair of the generally vertical slots 70 in the side walls of the heating compartment through which ends of the heating element 24 also project through the slots to the supporting clips. Each of the bendable tabs 106 extends upward through a small slot 108 on each side of the separator 90. Each tab 106 is bent back outwardly to secure the separator 92 to the separator support finger 104.

The clips 98 can be, for example, galvanized steel, electroplated cold rolled steel, anodized aluminum or an alloy thereof, a high temperature resistant plastic such as PPS or other material of suitable pliability and resistance to the high temperatures to be expected in a food heating or cooking appliance. Similarly, the separator 90 can be, for example, galvanized steel, electroplated cold rolled steel, anodized aluminum or an alloy thereof, or other, preferably metal, material. It too should be of a material that satisfactorily resists the temperatures to be expected. Preferably, for best performance, the separator is reflective or shiny so that its lower surface reflects radiant heat from the heating element 24 to the food location.

The oven with the adjustable separator 90 improves the performance of the oven with reconfigurable heater shown in FIGS. 1-6 by confining the location to be heated to a smaller volume containing the food item to be heated or cooked. In other words smaller or thinner food items can have the separator 90 lower to require the heating element 24 to heat a smaller volume, so the temperature at the food item location is raised more quickly and less electrical power is needed to heat the confined space than is needed to heat the entire interior of the oven. In a toaster oven, for example, the oven can be made to act more like the conventional bread toaster by bringing the heating element 24 and the separator 90 close to the slice or slices of bread. The separator need not tightly seal off the heater-containing location or cooking chamber that it adjustably forms, although it may. Improved cooking, faster heating and cooking and lower power consumption can be achieved even if the separator fits relatively loosely in the heating chamber.

While specific preferred embodiments of the invention have been described, those skilled in the art will readily recognize modifications, variations and equivalents that do not depart from the spirit and scope of the subject invention, as herein claimed.

We claim:

1. An electrical food heating appliance having an enclosure, a food heating chamber, at least one electrical heating element within the enclosure, an at least partially rotatable manual control member carried at a first side of the appliance on the appliance's exterior, a first linkage connected with the manual control member and located at the first side of the appliance and converting rotational movement of the manual control member to vertical linear movement of a first support connected thereto, a motion transfer bar mounted for rotation, connected with the at least partially rotatable manual control member, extending from the first side of the appliance to an opposite, second side of the appliance, and connected at the opposite, second side of the appliance with a second linkage for converting at least partial rotation of the motion transfer bar imparted to the motion transfer bar by the manual control member to vertical linear movement of a second support connected to the second linkage, the electrical heating element extending across the food heating chamber from proximate the first side to proximate the second side and connected to the first and second supports for substantially vertical, substantially linear movement within the enclosure, a substantially horizontally disposed heat reflective separator plate extending across the food heating chamber from proximate an interior enclosure wall at the first side to proximate an interior enclosure wall at the second side, and from proximate an interior back wall of the chamber to proximate a front interior closure surface of the chamber, the separator plate located on the opposite side of the heating element from a food heating location within the chamber, and connected to the first and second supports for substantially vertical, substantially linear movement; whereby manually turning the at least partially rotatable manual control member in one direction moves the first and second supports substantially vertically and substantially linearly in one direction toward the food heating location to move the heating element and separator plate nearer a food item located therein and to contract the food heating location, and manually turning the at least partially rotatable manual control member in a second, opposite direction moves the first and second supports substantially vertically and substantially linearly in a second, opposite direction away from the food heating location to move the heating element and separator plate away from the food heating location and to expand the food heating location.

2. The electrical food heating appliance according to claim 1, wherein the separator plate has a reflective surface facing the at least one heating element to reflect radiant heat towards the food heating location in the food heating chamber.

3. The electrical food heating appliance according to claim 1, wherein the first and second linkages each comprise a pair of pivotally connected links, one end of a first of the pivotally connected links in each of the first and second linkages being connected to the at least partially rotatable control member or the motion transfer bar for rotational movement therewith, a pair of substantially vertical and substantially linear slots in the interior enclosure walls at the first and second sides of the appliance, the first and second linkages being located along the interior enclosure walls at the first and second sides of the appliance respectively, exterior of the food heating chamber, the first and second supports being pivotally connected with an end of a second of the pivotally connected links of the first and second linkages respectively, and with the at least one heating element and the separator plate within the food heating chamber, the one end of each of the second pivotally connected links and the first and second supports being constrained for substantially vertical and substantially linear movement along the pair of slots.

4. The electrical food heating appliance according to claim 3, at least a portion of the first and second supports lying outside the interior of the food heating chamber and the at least one electrical heating element having ends extending through the slots from within the chamber and connected to the first and second supports.

5. The electrical food heating appliance according to claim 4, each of the first and second supporting having an inwardly projecting finger of a clip extending through each slot to support the separator plate at each side thereof.

* * * * *